United States Patent
Pugh et al.

(10) Patent No.: US 9,896,172 B1
(45) Date of Patent: Feb. 20, 2018

(54) APPARATUSES AND METHODS FOR SERVICING LUBRICATION IN A MARINE DRIVE

(71) Applicant: Brunswick Corporation, Lake Forest, IL (US)

(72) Inventors: Jason F. Pugh, Ripon, WI (US); Steven R. Miller, Fond du Lac, WI (US)

(73) Assignee: Brunswick Corporation, Mettawa, IL (US)

( * ) Notice: Subject to any disclaimer, the term of this patent is extended or adjusted under 35 U.S.C. 154(b) by 232 days.

(21) Appl. No.: 15/002,834

(22) Filed: Jan. 21, 2016

(51) Int. Cl.
*B63H 20/00* (2006.01)
*F16H 57/04* (2010.01)

(52) U.S. Cl.
CPC ....... *B63H 20/002* (2013.01); *F16H 57/0435* (2013.01); *F16H 57/0436* (2013.01)

(58) Field of Classification Search
CPC ...... B63H 20/002; B63H 23/08; B63H 20/20; B63H 20/14; B63H 21/386; F01M 11/0004; F01M 5/001; F01P 3/202; F16H 57/0435; F16H 57/0436; F02B 61/045
See application file for complete search history.

(56) References Cited

U.S. PATENT DOCUMENTS

| | | | |
|---|---|---|---|
| 3,335,817 A | 8/1967 | Horning | |
| 3,951,096 A * | 4/1976 | Dunlap | B63H 20/002 440/57 |
| 4,169,432 A | 10/1979 | White | |
| 4,285,360 A | 8/1981 | Bauer | |
| 4,397,198 A | 8/1983 | Borgersen et al. | |
| 4,650,430 A | 3/1987 | Schiek | |
| 4,764,135 A | 8/1988 | McCormick | |
| 4,872,531 A | 10/1989 | Meisenburg et al. | |
| 4,875,884 A | 10/1989 | Meisenburg | |
| 4,884,660 A | 12/1989 | Bedi | |
| 4,913,109 A | 4/1990 | Slattery | |
| 4,986,777 A | 1/1991 | Preston | |
| 5,002,154 A | 3/1991 | Chen | |
| 5,044,334 A | 9/1991 | Bedi | |

(Continued)

OTHER PUBLICATIONS

U.S. Appl. No. 14/585,872, filed Dec. 30, 2014; Fortl et al., "Planetary Transmission Arrangements for Marine Propulsion Devices."

(Continued)

*Primary Examiner* — William E Dondero
*Assistant Examiner* — Robert T Reese
(74) *Attorney, Agent, or Firm* — Andrus Intellectual Property Law, LLP (57) ABSTRACT

A lubrication system in a marine drive has a lubrication circuit that conveys lubrication to componentry of the marine drive and a lubrication service port connected to the lubrication circuit. The lubrication system further includes a pump disposed in the marine drive, wherein the pump pumps lubrication through the lubrication circuit. A hydraulic valve is connected to the lubrication circuit, wherein the hydraulic valve has a normal operating position wherein lubrication in the lubrication circuit is pumped by the pump to the componentry, and has a servicing position wherein lubrication in the lubrication circuit is pumped by the pump to the lubrication service port.

20 Claims, 9 Drawing Sheets

(56) References Cited

U.S. PATENT DOCUMENTS

| | | | | |
|---|---|---|---|---|
| 5,070,831 | A | 12/1991 | Yunick | |
| 5,074,380 | A | 12/1991 | Bedi et al. | |
| 5,190,120 | A | 3/1993 | Watts | |
| 5,236,380 | A | 8/1993 | Schueller et al. | |
| 5,246,086 | A | 9/1993 | Yunick | |
| 5,284,223 | A | 2/1994 | Fisher | |
| 5,352,141 | A | 10/1994 | Shields et al. | |
| 5,462,463 | A | 10/1995 | Meisenburg et al. | |
| 5,487,687 | A | 1/1996 | Idzikowski et al. | |
| 5,494,012 | A | 2/1996 | Hagen | |
| 5,522,351 | A | 6/1996 | Hudson | |
| 5,522,475 | A | 6/1996 | Thompson | |
| 5,682,851 | A | 11/1997 | Breen et al. | |
| 5,787,372 | A | 7/1998 | Edwards et al. | |
| 5,899,779 | A | 5/1999 | Hattori | |
| 6,050,295 | A | 4/2000 | Meisinger et al. | |
| 6,123,174 | A | 9/2000 | Elkin et al. | |
| 6,126,499 | A * | 10/2000 | Katayama | F01M 11/0004 123/196 W |
| 6,132,275 | A | 10/2000 | Tanaka et al. | |
| 6,213,173 | B1 | 4/2001 | Bedi et al. | |
| 6,227,332 | B1 | 5/2001 | Liao | |
| 6,321,874 | B1 | 11/2001 | Miyamoto | |
| 6,378,657 | B2 | 4/2002 | Viken | |
| 6,478,646 | B1 | 11/2002 | Fukuoka et al. | |
| 6,575,797 | B1 | 6/2003 | Martin et al. | |
| 6,604,557 | B2 | 8/2003 | Awad | |
| 6,655,341 | B2 | 12/2003 | Westerbeke, Jr. | |
| 6,755,704 | B1 | 6/2004 | Leinonen | |
| 6,772,802 | B2 | 8/2004 | Few | |
| 6,772,803 | B2 | 8/2004 | Awad | |
| 6,779,633 | B2 | 8/2004 | Viken | |
| 6,837,210 | B2 | 1/2005 | Tsuchiya | |
| 6,886,606 | B2 | 5/2005 | Few et al. | |
| 6,896,014 | B1 | 5/2005 | Bedi | |
| 6,902,038 | B2 | 6/2005 | Takahara | |
| 7,033,234 | B2 | 4/2006 | Arvidsson et al. | |
| 7,118,434 | B2 | 10/2006 | Arvidsson et al. | |
| 7,131,385 | B1 | 11/2006 | Ehlers et al. | |
| 7,182,657 | B2 | 2/2007 | Mansson | |
| 7,186,157 | B2 | 3/2007 | Mansson et al. | |
| 7,188,581 | B1 | 3/2007 | Davis et al. | |
| 7,234,983 | B2 | 6/2007 | Davis | |
| 7,267,068 | B2 | 9/2007 | Bradley et al. | |
| 7,467,689 | B1 | 12/2008 | Batten, Jr. et al. | |
| 7,850,496 | B1 | 12/2010 | Eichinger | |
| 8,333,629 | B2 * | 12/2012 | McChesney | F01P 3/202 123/41.02 |
| 9,630,694 | B1 * | 4/2017 | Jaszewski | B63H 20/002 |
| 9,676,463 | B1 * | 6/2017 | Fortl | B63H 23/08 |
| 9,840,316 | B1 * | 12/2017 | Jaszewski | B63H 20/20 |
| 2003/0079943 | A1 | 5/2003 | Suratt | |
| 2003/0094588 | A1 | 5/2003 | Chen | |
| 2004/0159495 | A1 | 8/2004 | Erwin et al. | |
| 2005/0189033 | A1 | 9/2005 | Buchanan | |
| 2009/0203272 | A1 * | 8/2009 | Okabe | B63H 20/14 440/75 |
| 2013/0288843 | A1 * | 10/2013 | Baum | F01M 5/001 475/160 |

OTHER PUBLICATIONS

U.S. Appl. No. 14/950,660, filed Nov. 24, 2015; Plonske et al., "Apparatuses and Methods for Servicing Lubrication in a Lower Gearcase of an Outboard Marine Engine."

* cited by examiner

APPARATUSES AND METHODS FOR SERVICING LUBRICATION IN A MARINE DRIVE

FIELD

The present disclosure relates to marine drives, and more particularly to apparatuses and methods for servicing lubrication in a lubrication system in a marine drive.

BACKGROUND

The following U.S. Patents and Patent Applications are incorporated herein by reference in entirety:

U.S. patent application Ser. No. 14/585,872, filed Dec. 30, 2014, discloses a transmission for a marine propulsion device having an internal combustion engine that drives a propulsor for propelling a marine vessel in water. An input shaft is driven into rotation by the engine. An output shaft drives the propulsor into rotation. A forward planetary gearset connects the input shaft to the output shaft so as to drive the output shaft into forward rotation. A reverse planetary gearset connects the input shaft to the output shaft so as to drive the output shaft into reverse rotation. A forward brake engages the forward planetary gearset in a forward gear wherein the forward planetary gearset drives the output shaft into the forward rotation. A reverse brake engages the reverse planetary gearset in a reverse gear wherein the reverse planetary gearset drives the output shaft into the reverse rotation.

U.S. Pat. No. 7,850,496 discloses a lubrication draining and filling system that provides oil passages that direct a flow of liquid oil from a bottom region of an oil sump, located within a rotatable portion of the marine propulsion system, to a discharge port which is connectable in fluid communication with a device that can sufficiently lower the pressure at the discharge port to induce the upward flow of oil from the lower portion of the oil sump within the gear case. The cavity of the oil sump within the gear case is disposed within a rotatable portion of the marine propulsion device while the discharge port is located within a stationary portion of the marine propulsion device. A transitional region comprises a space located between the stationary and rotatable portions. The oil can therefore flow from a rotatable portion, into the space, and then from the space into the stationary portion which allows it to be removed from the marine propulsion device.

U.S. Pat. No. 7,467,689 discloses an arrangement wherein positive pressure is used to induce the flow of a liquid lubricant from a crankcase and through a drain conduit so that used oil can be removed from the engine and collected in a container during an oil change procedure. Positive pressure is introduced into the crankcase, and into an ullage region above the liquid lubricant, by the use of an inlet valve that can be attached to a cam cover to replace a PCV valve temporarily during the oil change.

U.S. Pat. No. 5,522,351 discloses a device to facilitate removal of oil from an outboard motor having an oil tank located in its drive shaft housing. An oil removal tube fitted in a bore through the adapter plate of the motor extends downwardly to the bottom of the oil tank and projects above the adapter plate and terminates inside the cowling for the motor. The top of the tube may be threaded to accept a connector to an oil removal pump.

U.S. Pat. No. 5,487,687 discloses an outboard marine drive having a midsection between the upper power head and the lower gear case and having a removable midsection cowl assembly including first and second cowl sections. The midsection housing includes an oil sump in one embodiment and further includes an exhaust passage partially encircled by cooling water and partially encircled by engine oil for muffling engine exhaust noise. The midsection housing also has an oil drain arrangement providing complete and clean oil draining while the outboard drive is mounted on a boat and in the water wherein the operator can change oil without leaving the confines of the boat and entering the water.

U.S. Pat. No. 5,462,463 discloses a marine drive that has two counter-rotating propellers. Inner and outer concentric counter-rotating propeller shafts are supported by a spool in the lower horizontal bore. Passages are provided in the housing for communicating lubrication and/or exhaust with the horizontal bore. Locking structure holds the driven gears and bearings in place in the lower horizontal bore.

U.S. Pat. No. 5,352,141 discloses a marine drive that has a spool positioned in the lower horizontal bore and supporting a dual propeller shaft assembly. An exhaust passage includes a passage in the drive housing communicating with the horizontal bore at the spool, and a spool exhaust passage passing exhaust rearwardly through the spool to the propeller through-hub exhaust passages, providing through-hub exhaust through dual propellers. An oil passage in the housing communicates with the horizontal bore forwardly of the exhaust passage and lubricates the dual propeller shaft assembly.

U.S. Pat. No. 4,764,135 discloses a marine stern drive unit wherein oil is circulated upwardly from the propeller housing and through the drive shaft sleeve to the upper gear case. A return oil line connects from the upper gear case and downwardly through the lower gear case to the propeller housing. The return line is disposed within a cooling water chamber communicating with the drive engine to create an intercooling or heat exchanging effect whereby the incoming water from a lake or the like cools the recirculating stern drive unit lubricant. A combination of threaded drive shaft and internally grooved sleeve is utilized to pump the oil through the system.

U.S. Pat. No. 4,650,430 discloses a lubrication and circulation system for a marine drive lower gear case. A self-lubricating heat conducting flat thrust washer bearing around the drive shaft has a bottom horizontal surface engaging the top of the pinion gear at the bottom of the drive shaft without needle bearings or roller bearings interposed there between. Lubricant frictionally dragged by the top of the pinion gear across the bottom horizontal surface of the thrust bearing washer is diverted along the slants of slots at an angle to the radius inwardly toward the drive shaft rotating therein. Upper and lower self-lubricating heat conducting sleeve bearings mount the drive shaft for rotation in the lower gear case without needle bearings or roller bearings there between. Each sleeve bearing has a spiral groove in its inner surface in a helical direction driving lubricant upwardly there through along the drive shaft as the latter rotates therein. Lubricant is circulated through the thrust washer bearing and the sleeve bearings to carry heat away from the bearings and substantially increase longevity thereof, matching and exceeding the life rating of needle or roller bearing arrangements for the vertical drive shaft in a marine drive.

U.S. patent application Ser. No. 14/950,660 filed Nov. 24, 2015 discloses an outboard marine engine comprises an internal combustion engine; a lower gearcase, a set of gears disposed in the lower gearcase, the set of gears being configured to transfer power from the internal combustion engine to drive a propulsor to generate a thrust on the outboard marine engine, and a dipstick that extends into the lower gearcase. The dipstick is removable from the lower gearcase and configured to indicate a level of lubrication in the lower gearcase.

SUMMARY

This Summary is provided to introduce a selection of concepts that are further described herein below in the Detailed Description. This Summary is not intended to identify key or essential features of the claimed subject matter, nor is it intended to be used as an aid in limiting the scope of the claimed subject matter.

In one embodiment a lubrication system in a marine drive has a lubrication circuit that conveys lubrication to componentry of the marine drive and a lubrication service port connected to the lubrication circuit. The lubrication system further includes a pump disposed in the marine drive, wherein the pump pumps lubrication through the lubrication circuit. A hydraulic valve is connected to the lubrication circuit, wherein the hydraulic valve has a normal operating position wherein lubrication in the lubrication circuit is pumped by the pump to the componentry, and has a servicing position wherein lubrication in the lubrication circuit is pumped by the pump to the lubrication service port.

In one embodiment, a marine drive on a marine vessel has a lubrication circuit that conveys lubrication to componentry of the marine drive. A lubrication service port is connected to the lubrication circuit, the lubrication service port positioned to be accessible by a user when the marine drive is in water body. A pump is disposed in the marine drive that pumps the lubrication through the lubrication circuit. A hydraulic valve is connected to the lubrication circuit, wherein the hydraulic valve is positionable into a normal operating position wherein the lubrication in the lubrication circuit is pumped to the componentry, and into a servicing position wherein lubrication in the lubrication circuit is pumped to the lubrication service port.

One embodiment of a method of servicing lubrication in a marine drive on a marine vessel is provided. The marine drive has a lubrication circuit that conveys lubrication to componentry of the marine drive and a pump that pumps the lubrication through the lubrication circuit. The method of servicing the lubrication includes adjusting a hydraulic valve in the lubrication circuit from a normal operating position wherein lubrication in lubrication circuit is directed to the componentry, to a servicing position where lubrication in the lubrication circuit is directed to a lubrication service port, and further includes driving the pump to pump lubrication in the lubrication circuit out of the lubrication service port.

BRIEF DESCRIPTION OF THE DRAWINGS

The present disclosure is described with reference to the following Figures. The same numbers are used throughout the Figures to reference like features and like components.

DETAILED DESCRIPTION OF THE DRAWINGS

Through their research and experimentation in the relevant field, the present inventors have determined that known methods for servicing lubrication in marine drives, such as in the lower gearcase of an outboard marine engine, are often inconvenient and time-consuming. Conventional outboard marine engines typically have removable fittings below the water line that need to be accessed by the operator to add and/or remove lubrication from the lower gearcase. This often requires the operator to either enter the body of water in which the marine vessel is situated or remove the outboard marine engine and/or marine vessel from the water. The present inventors have realized that it would be desirable to provide apparatuses and methods that more conveniently facilitate servicing of lubrication in the marine drive, for example that do not require the operator to enter the water and/or remove the outboard marine engine and/or marine vessel from the water. While the depicted embodiments show the marine drive 1 as an outboard motor, a person having ordinary skill in the art will understand in light of this disclosure that the devices, systems, and methods disclosed herein are equally applicable to other types of marine drives, including inboards, inboard/outboards, stern drives, or the like.

Figure 1:
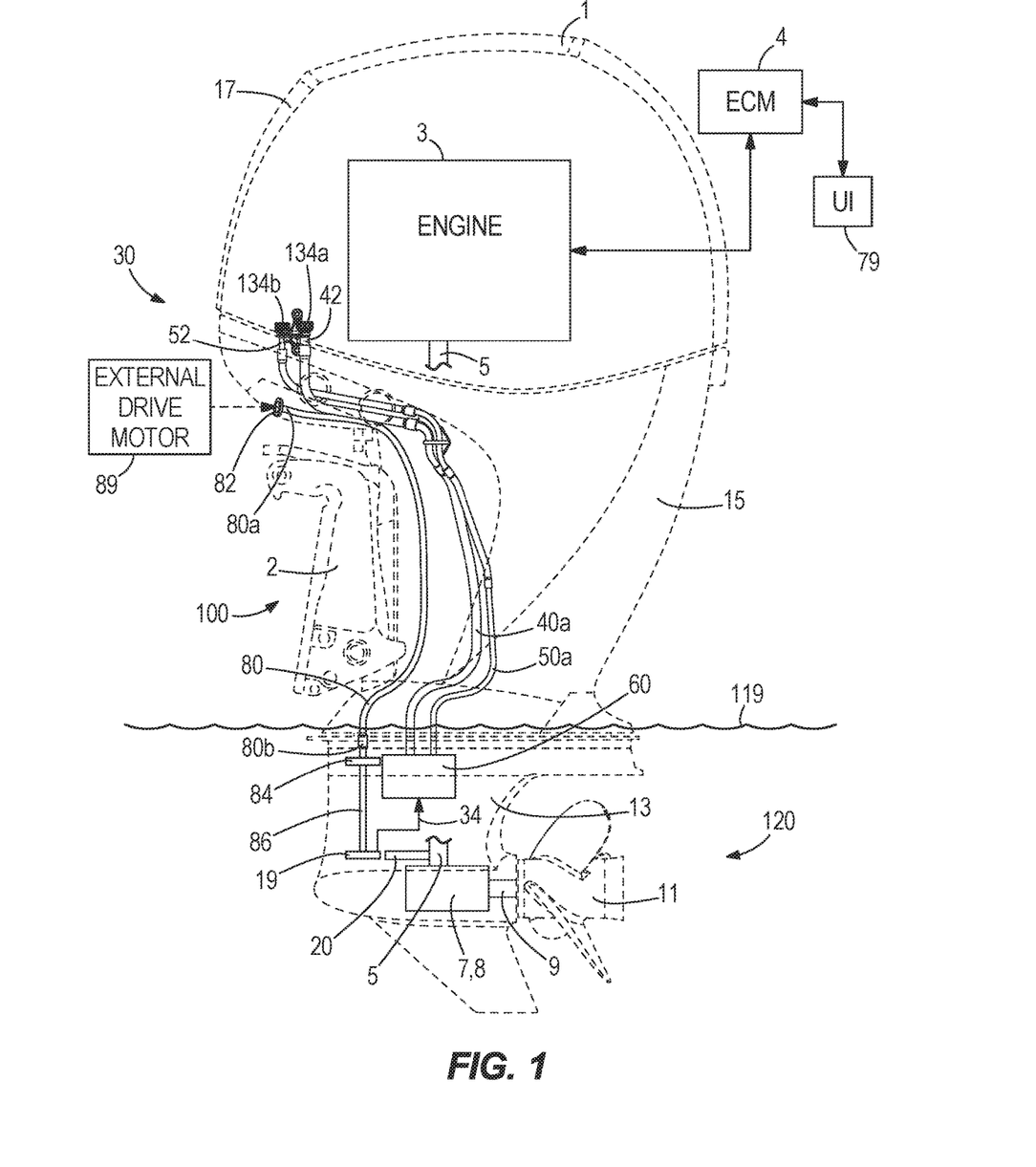
FIG. 1 is a side view, shown partially in phantom line, of one embodiment of a marine drive having a lubrication system according to the present disclosure.

FIG. 1 depicts one embodiment of a marine drive 1 connected to a marine vessel 100. The marine drive 1 has a lubrication system 30 that has a lubrication service port 42 through which lubrication in the lubrication system 30 can be serviced. The lubrication system 30 includes lubrication circuit 32 that conveys lubrication to componentry of the marine drive, and a pump 19 that pumps the lubrication through the lubrication circuit 32. The lubrication system 30 further includes a hydraulic valve 60 connected to the lubrication circuit 32. As is exemplified in the embodiments shown in FIGS. 2A-2C and FIGS. 3A-3C, the hydraulic valve 60 is positionable into a normal operating position 90 where lubrication in the lubrication circuit 32 is pumped by pump 19 to componentry in the marine drive 1, and the hydraulic valve 60 also has a servicing position 91 wherein the pump 19 pumps the lubrication in the lubrication circuit 32 to the lubrication service port 42. For example, the componentry may include bevel gears, a transmission, a clutch, a propulsor shaft, and/or other gear arrangements, gearcase bearings, shafts, or similar moving parts within the lower gearcase 13.

In the exemplary embodiment of FIG. 1, the marine drive 1 is an outboard motor that connects to the marine drive 100 via a mounting bracket 2. The outboard motor has a housing comprised of an engine housing 17, a housing midsection 15, and a lower gearcase 13. The lower gearcase 13 is generally below the water line 119, and generally houses the propulsor shaft 119, a transmission 8, other gear arrangements 7, and/or other componentry. A conventional outboard marine drive 1 is depicted, which has an engine 3 (generally an internal combustion engine) that drives a vertically oriented driveshaft 5 into rotation. Rotation of the driveshaft 5 is transmitted to the propulsor shaft 9 connected to a propulsor 11, such as a propeller or an impeller. The rotation is transmitted from the driveshaft 5 to the propulsor shaft 9 via a transmission 8 and/or other gear arrangements 7. The transmission 8 may include any mechanical arrangement for the transmission of rotational motion, such as a planetary gear arrangement, a dog clutch or another clutch device, or the like. Furthermore, the transmission 8 may be located in the lower gearcase 13, or it may be located above the lower gearcase 13 in the midsection. One example of a suitable transmission is provided in the incorporated U.S. patent application Ser. No. 14/585,872. The transmission 8 is actuated by a shift shaft between forward, neutral, and reverse gears to thereby transmit the power of the engine 3 to the propulsor shaft 9, or to a further gear arrangement 7 connected to the propulsor shaft 9. For example, the gear arrangement 7 may be a set of bevel gears or other gears that interact with each other to transmit rotation of a vertically oriented output shaft of the transmission 8 to the horizontally extending propulsor shaft 9. Rotation of the propulsor shaft 9 rotates the propulsor 11, which may include one or more propellers or impellers, to generate a thrust on the marine drive 1, which is transferred to propel the marine vessel 100 in the body of water 120.

A lubrication pump 19 is disposed in the lower gearcase 13 and is configured to pump lubrication through passages in the lower gearcase 13 to thereby lubricate the componentry therein, such as the transmission 8 and/or gear arrangement 7. The type of pump 8 can vary from that shown. In the illustrated example, the pump 19 is a disc-shaped rotor pump that is driven by rotation of the driveshaft 5 via drive link 20, which may be any device providing a direct or indirect connection that can transmit rotational motion from the driveshaft 5 to drive the pump 19. For example, the drive link may be an intermediate gear. The pump 19 and the associated componentry, such as the drive link, are items of known design. For example the pump 19 may be a gerotor pump, a piston pump, or another type of positive displacement pump.

Accordingly, when the engine 3 is operating, the pump 19 may be selectively driven by the driveshaft 5 in order to circulate lubrication. The pump 19 may also be used to pump lubrication out of the lubrication circuit 32, such as to remove used lubricant from the lubrication circuit 32. The hydraulic valve 60 serves to selectively guide the lubrication pumped by the pump 19, either to the lubrication circuit 32 or towards the lubrication service port 42. Specifically, lubrication traveling from the pump 19 through the pump line 34 enters the hydraulic valve 60, which has a normal operating position 90 that diverts the lubrication to the lubrication circuit 32, and a servicing position 91 that diverts the lubrication toward the lubrication service port 42. In the depicted embodiment, the hydraulic valve 60 connects to an upper service line 40a that leads to the lubrication service port 42. The hydraulic valve 60 also connects to an upper vent line 50a that allows air into the lower gearcase 30 to replace the lubrication as it is pumped out of the lubrication service port 42. The upper vent line 50a connects to atmosphere through a vent opening 52. The vent opening 52 and the lubrication service port 42 may each have a removable cap 134a, 134b positioned thereon or therein to protect the openings from the intrusion of debris or foreign objects when lubrication is not being serviced. Accordingly, when initiating service of the lubrication system 30, a user would first remove the caps 134a, 134b from the lubrication service port 42 and the vent opening 52. As depicted in FIGS. 1 and 7, the lubrication service port 42 and the vent opening 52 may be positioned at a location inside the engine housing 17 that is easily access by a user while standing on the marine vessel 2. The engine housing 17, or a portion thereof, may be removable as depicted in FIG. 7.

In order for the pump 19 to pump lubrication to the service port 42, and thus out of the lubrication system 30, the pump 19 must be driven into rotation, either by the driveshaft 5 as described above or by other means. In order for the pump 19 to be driven into rotation by the driveshaft 5, the engine 3 must be running. However, through their experimentation and research in the relevant field, the present inventors have recognized that it may be desirable to service the lubrication of a lubrication system 30 when the engine 3 is not running. Accordingly, the present inventors developed the disclosed system, which provides an arrangement that allows connection of an external drive motor 89 to the drive pump 19 in order to operate the pump when the engine 3 is not running. In the depicted embodiment, rotation of the external drive motor 89 is transmitted via flexible drive cable 80. The flexible drive cable 80 has a first end 80a connected to a fitting 82 that is attachable to the external drive motor 89. The second end 80b of the flexible drive cable 80 operably connects, either directly or indirectly, to the pump 19. In one embodiment, the flexible drive cable 80 may be a tightly wound multi-strand cable with square drive tips on each end to transfer the rotational torque. The drive cable rotates and is captured within a fixed housing or flexible sheathing that is routed as needed to allow the transfer of torque. The flexible nature of the wound cable accommodates angular changes in power transmission that are difficult or impossible to achieve with shafts and gears. The cable can be routed as needed to connect the external driving source to the pump 19. In the depicted embodiment, the second end 80b attaches to a one-way bearing 84 that connects to the pump 19 through a rigid shaft 86. Thus, rotation of the external drive motor 89 is transmitted to the flexible drive cable 80, which turns the one-way bearing 84, which turns the shaft 86, which turns the pump 19. To provide just one example, the external drive motor 89 may be provided by a portable electric screw driver fitted with a bit configured to provide connection to the fitting 82, such that rotation of the bit at the end of the electric screwdriver is imparted to the flexible drive cable 80 and eventually to the pump 19 to pump lubricant while the engine 3 is not running.

Figure 2A:
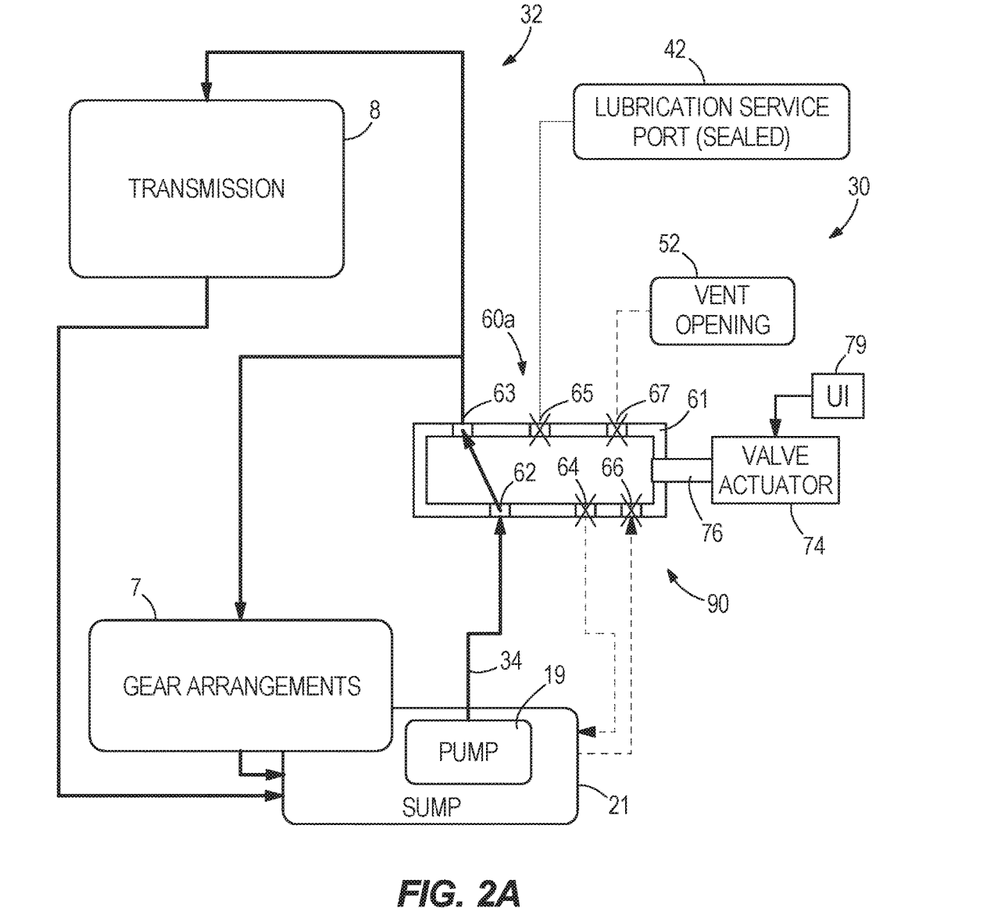
FIGS. 2A-2C provide a diagrammatic representation of one embodiment of a lubrication system according the present disclosure.
Figure 2B:
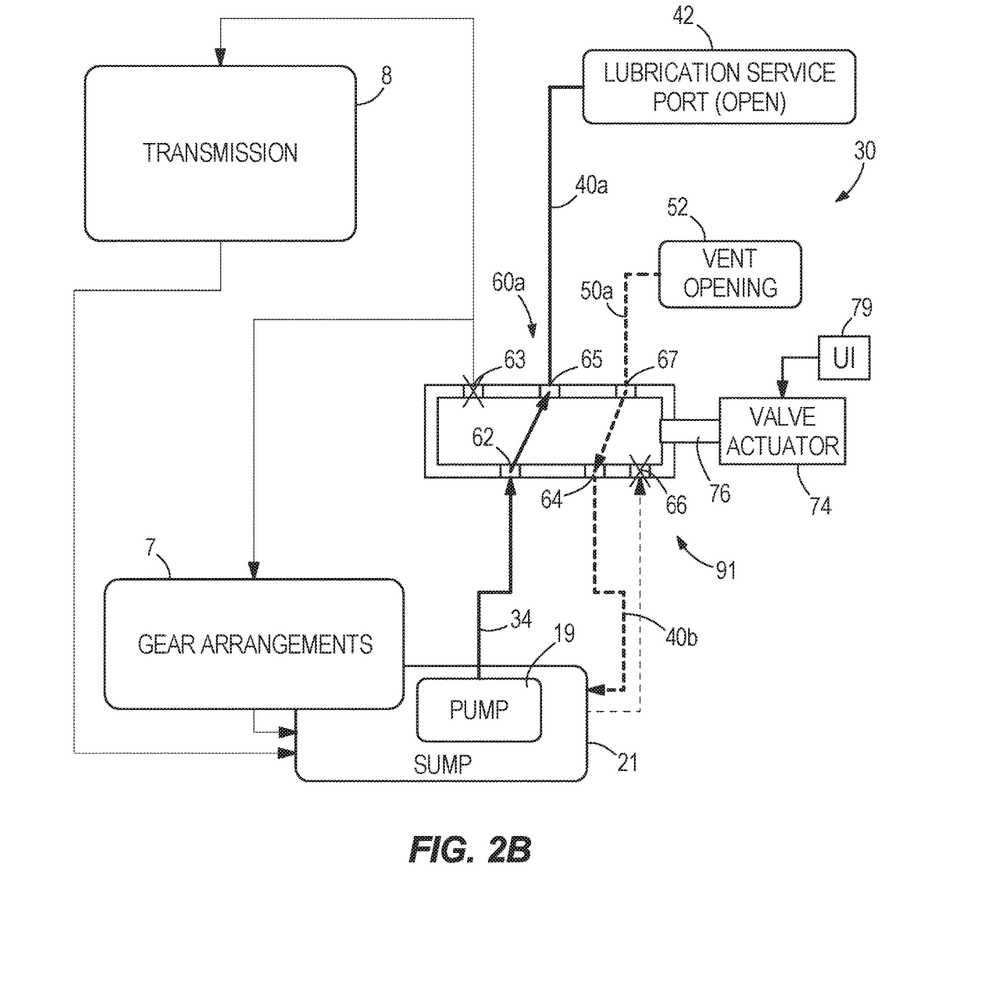
Figure 2C:
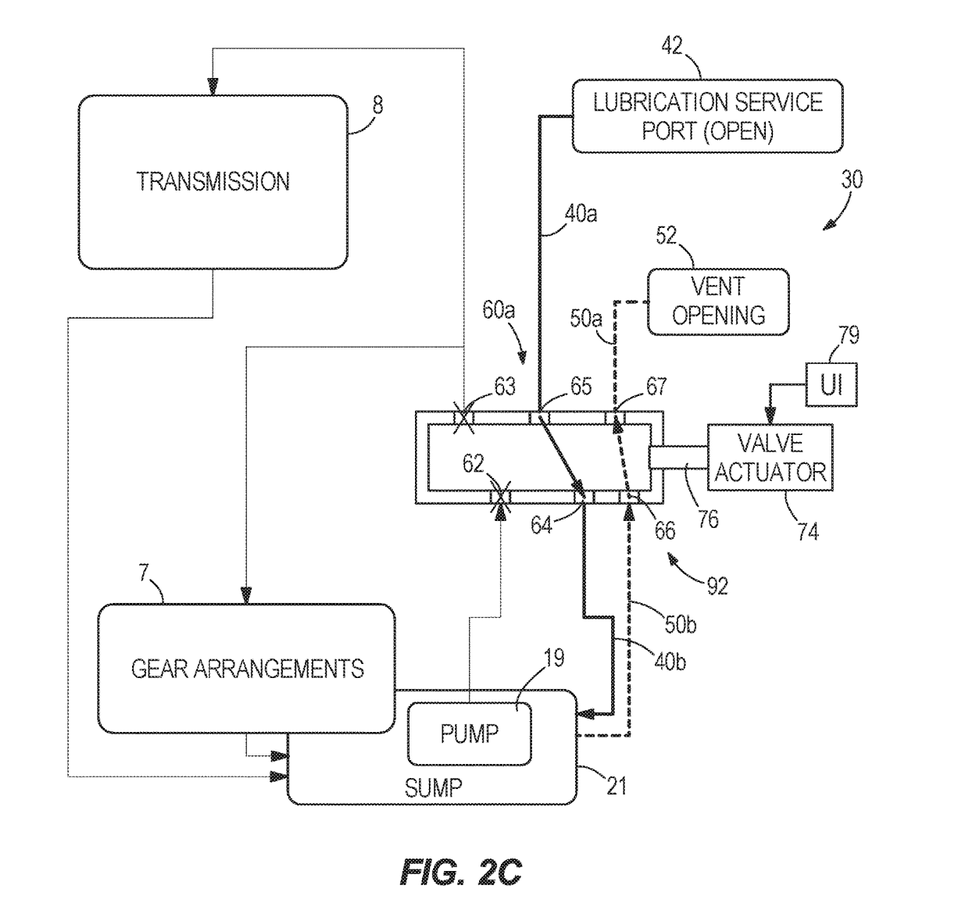

The hydraulic valve 60 may be any type of valve capable and appropriate for controlling the direction of lubrication fluid in order to control the flow path thereof, either directing it to the componentry, such as the gear arrangement 7 and/or transmission 8, through the lubrication circuit 32 or to the lubrication service port. FIGS. 2A-2C illustrate one embodiment of the hydraulic valve, which is a three-position, six-port, spool valve. In other embodiments, the hydraulic valve may be a two-way hydraulic valve and for example the vent system may be controlled by a second valve or by other means. In still other embodiments, the hydraulic valve may be a different type of direction control valve that controls both lubrication and air flow during servicing. FIGS. 2A-2C depict one embodiment of a lubrication circuit 32 having a pump 19 and connected to a three-position hydraulic valve 60a. The three-position hydraulic valve 60a has a normal operating position 90, a servicing position 91, and a fill position 92. The lubrication system 30 and the three position hydraulic valve 60a in each of these three positions 90-92 are functionally represented in the system diagrams at FIGS. 2A-2C. In FIG. 2A, the three-position hydraulic valve 60a is in the normal operating position 90 where lubrication flowing from the pump 19 is conveyed to the componentry 7, 8 through lubrication circuit 32. Specifically, lubrication is moved from pump 19 through pump line 34 to a first lower port 62, and is then directed through the hydraulic valve 68 to a first upper port 63. The lubricant then flows out of the first upper port 63 through the lubrication circuit 32 to the various componentry, which in the depicted embodiment includes gear arrangement 7 and transmission 8. Specifically, the lubrication flows in parallel to each of the gear arrangements 7 and transmission 8, and then flows from each of those components to the sump 21 from which the pump 19 will draw the lubrication in order to recirculate it. This is the normal operation of the lubrication circuit 32, such as when the engine 3 is running.

The lubrication system 30 may be put in a servicing mode so that the lubrication may be removed and replaced. The three-position hydraulic valve 60a is put into the servicing position 91 depicted at FIG. 2b. The position of the hydraulic valve 60a is moved by a valve actuator 74. The valve actuator 74 acts on spool 76 to selectively open and close the various ports 62-67 in order to vary the flow path of the lubrication. The valve actuator may be a manually driven mechanical connection, such as a manually-operated lever connected to the spool 76. Alternatively, the actuator may be electrically or hydraulically driven. For example, the valve actuator 74 may be moved by a solenoid acting on the spool 76 when the solenoid is energized to selectively move the spool to any one of the three positions 90-92. For example, in one embodiment the spool 76 may be biased into one of the three positions, such as by a spring, and the solenoid may be selectively and increasingly energized to move the spool 76 to the other two positions. Energization of the solenoid may be controlled by the engine control module 4, which may automatically move the spool 76 from the normal operating position 90 to the servicing position 91, for example, upon receiving input from a user to initiate lubrication servicing. For example, the user may provide input through a user interface 79, which may be the user interface for the entire marine drive system or entire vessel, such as an on-board management system. In another embodiment, the user interface 79 may be a mechanical switch, such as a push button switch, or the like. In other embodiments, the valve actuator 74 may be hydraulically driven, such as by hydraulic pressure within the lubrication circuit 32.

When the hydraulic valve 60a is in the servicing position 91, the lubricant is evacuated by the pump 19, from the sump 21 through pump line 34 to the first lower port 62 of the three position hydraulic valve 60a. From there, the lubricant is directed to the second upper port 65. The first lower port 63 is closed by spool 76. The lubricant then is directed through upper service line 40a to the lubrication service port 42, such as in the embodiment depicted in FIG. 1.

During this evacuation process, the lubrication circuit 32 is vented to the atmosphere via vent opening 52 and vent line 50. In the embodiment of FIG. 2, the vent opening 52 connects to the upper vent line 50a, which connects to the third upper port 67 of the hydraulic valve 60a. Air from the atmosphere is sucked in to the lubrication circuit 32 to replace the lubricant as it is evacuated. In the depicted servicing position 91 the air path through the valve is from the third upper port 67 to the second lower port 64, which connects to the lower service line 40b. Accordingly, as the lubricant is pumped out, air is sucked into the sump. Alternatively or additionally, the air may also flow through the third lower port 66 and lower vent line 50b.

In FIG. 2C, the hydraulic valve 60a is in a third position, which is the fill position 92. Here, lubricant can be added back into the lubrication circuit 32 through the lubrication service port 42 while air is evacuated out of vent opening 52. Fresh lubricant entering the system travels down the upper service line 40a to the second upper port 65, where it is directed to the second lower port 64. The second lower port 64 directs the fresh lubricant into the lower service line 40b, which carries it to the sump 21. Meanwhile, the lubricant displaces air in the lubrication circuit 32, which is forced into the lower vent line 50b connected to the third lower port 66, and then directed through the hydraulic valve 60a to the third upper port 67, and then to upper vent line 50a and out the vent opening 52. In the fill position, the first lower port 62 and the first upper port 63 may be closed by the spool 76 so that the fresh lubricant is forced in the depicted path to the lower service line 40b.

The line, or passage way, portions that are above the lower gearcase 13, including the upper service line 40a and the upper vent line 50a may be made of a polymer material, and the line portions in the lower gearcase 13, which may be continuously exposed to lubricant may be made of a metal material.

Figure 3A:
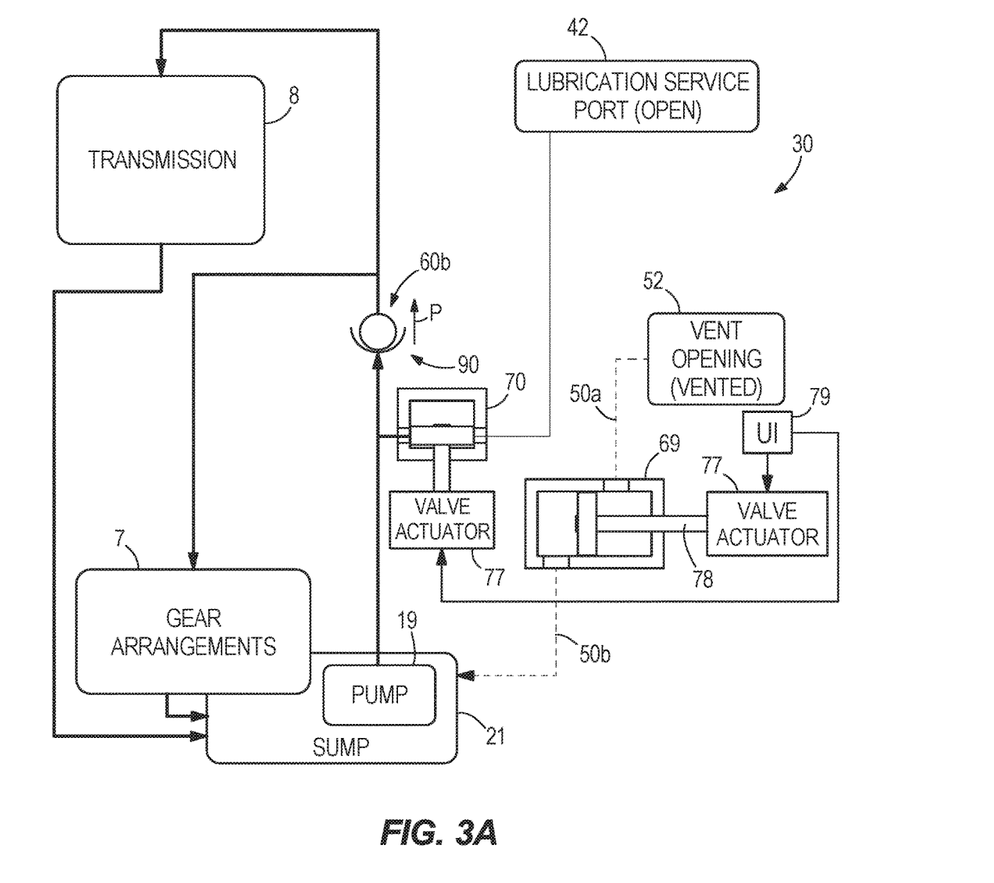
FIGS. 3A-3C provide a diagrammatic representation of another embodiment of a lubrication system according the present disclosure.
Figure 3B:
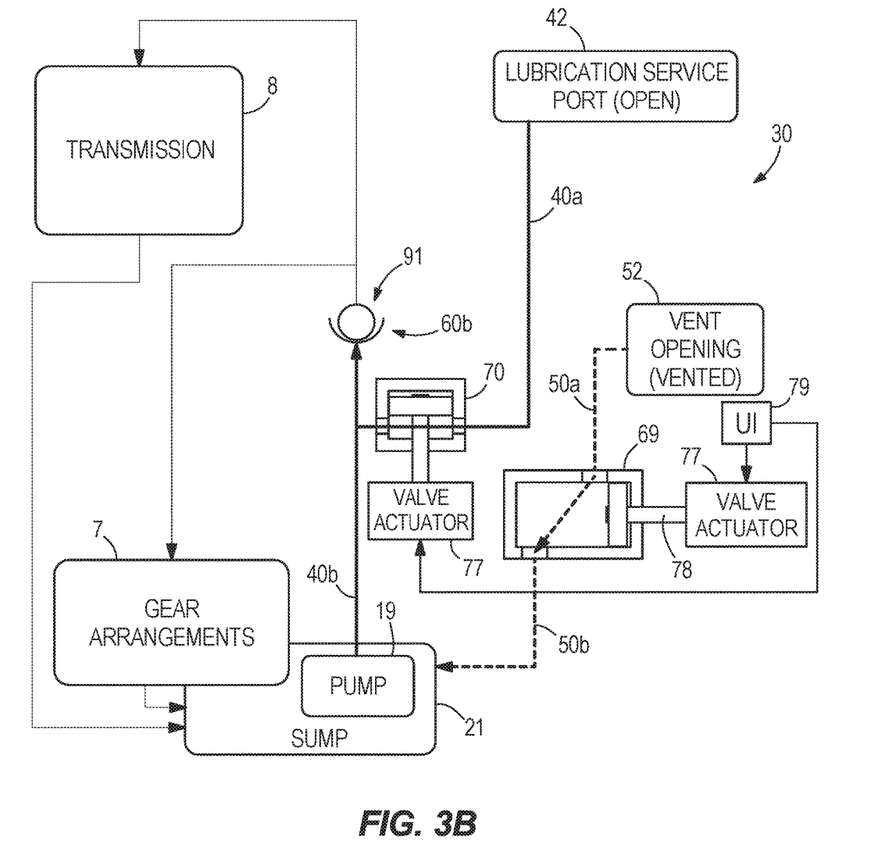
Figure 3C:
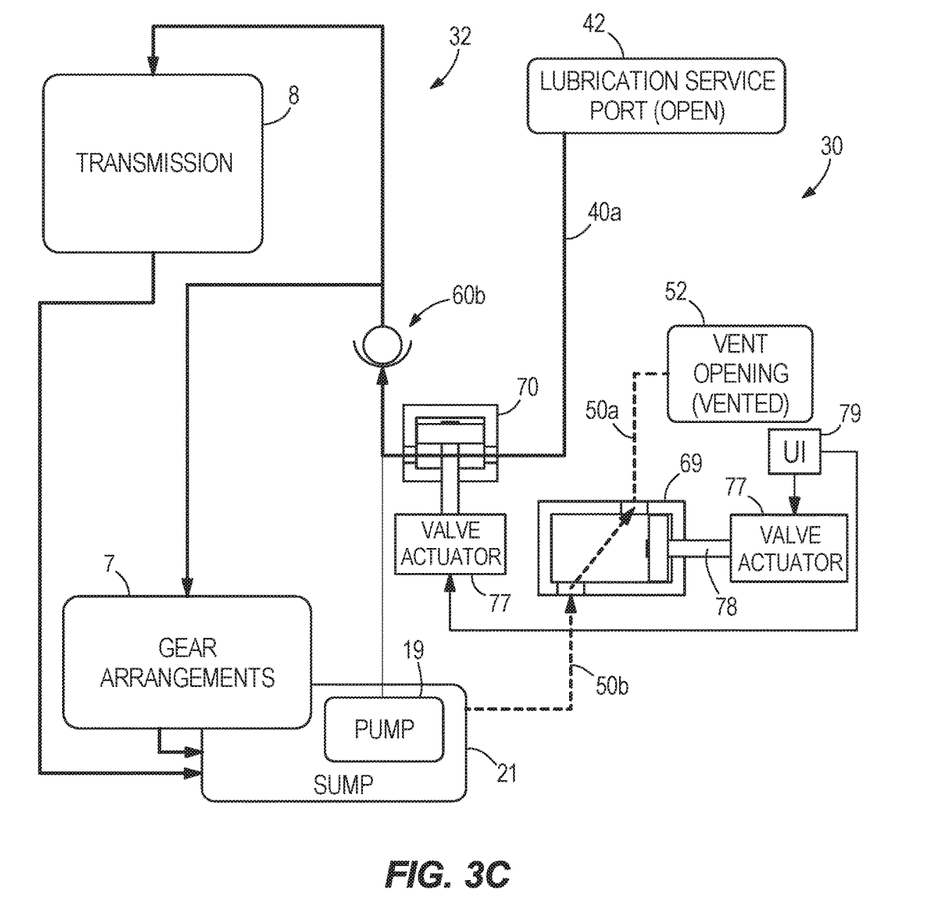

FIGS. 3A-3C depict another embodiment of a lubrication system 30 wherein the hydraulic valve is a check valve 60b. FIG. 3A depicts the check valve in a normal operating position 90, which permits lubricant from pump 19 to flow into the lubrication circuit 32 where it is delivered to the componentry, including the gear arrangement 7 and the transmission 8. For example, low pressure, spring-loaded check valve. The check valve is biased into a close position by a spring such that it blocks the flow of lubrication into the lubrication circuit 32 when there is insufficient positive pressure in the direction of arrow P exerted by lubricant flowing through the lubrication circuit 32 to overcome the bias force of the spring. This no pressure, or very low pressure, situation occurs when the engine 3 is not running, or when the lubrication service port 42 and vent opening 52 are open. This serves as the servicing position 90, which is shown in FIG. 3B. Under the normal operating pressure within the lubrication circuit 32, when the pump 19 is running, which is in the direction of arrow P, and the lubrication service port 42 and vent opening 52 are closed, the check valve opens. The check valve 60b is placed in the servicing position 91 when the lubrication service port 42 and the vent opening 52 are open because the pressure in the system caused by the pump 19 is released out of the lubrication service port 42. Thus, the pressure in that instance is not sufficient to cause the check valve 60b to open—i.e., the lubrication is forced to the upper service line 40a and out the lubrication service port 42 while air is sucked in through the vent opening 52. For example, the spring-loaded check valve may open under a positive pressure in the direction of arrow P of 5 psi. Preferably, the threshold pressure required to open the check valve 60b into the normal operating position 90 is less than the normal operating pressure within the lubrication circuit 32.

The depicted embodiment further includes a vent valve 69 which opens and closes the passage way to the vent opening 52, and evacuation valve 70 on the path of the upper service line 40a which selectively opens and closes the pathway to the lubrication service port 42. The vent valve 69 and the evacuation valve 70 may be any type of valve, and may be actuated electrically, hydraulically, or mechanically. For example, the vent valve 69 and the evacuation valve 70 may be spool valves having two positions, an opened position and a closed position and two ports, as is depicted in FIG. 3B. The vent valve 69 and the evacuation valve 70 may be actuated simultaneously, such as in response to a signal from a user interface 79 or from an engine control module 4. In other embodiments, the vent valve 69 and the evacuation valve 70 may be separately actuated. Alternatively, the vent valve 69 and the evacuation valve 70 may be combined into a single valve, such as a tube position, for port spool valve, with an open position where both the vent valve 69 and the evacuation valve 70 are open and a second position where they are both closed. In still another alternative embodiment, the lubrication system may not include any vent valve 69 or evacuation valve 70, and instead the lubrication service port 42 and the vent opening 52 may be selectively opened and closed, such as by the removable caps 134a and 134b depicted in FIG. 1 or by self-sealing hydraulic couplers. In the depicted example, the removable caps 134a and 134b are connected to the lubrication service port 42 and the vent opening 52, respectively, by a threaded connection such that rotation of each of the removable caps 134a and 134b, respectively, in one direction disconnects the removable cap 134a, 134b. In some embodiments, the removable cap 134a, 134b may provide a sufficient seal in order to allow maintenance of the normal operating pressure within the lubrication circuit 32 during normal operation.

Figures 4A, 4B:
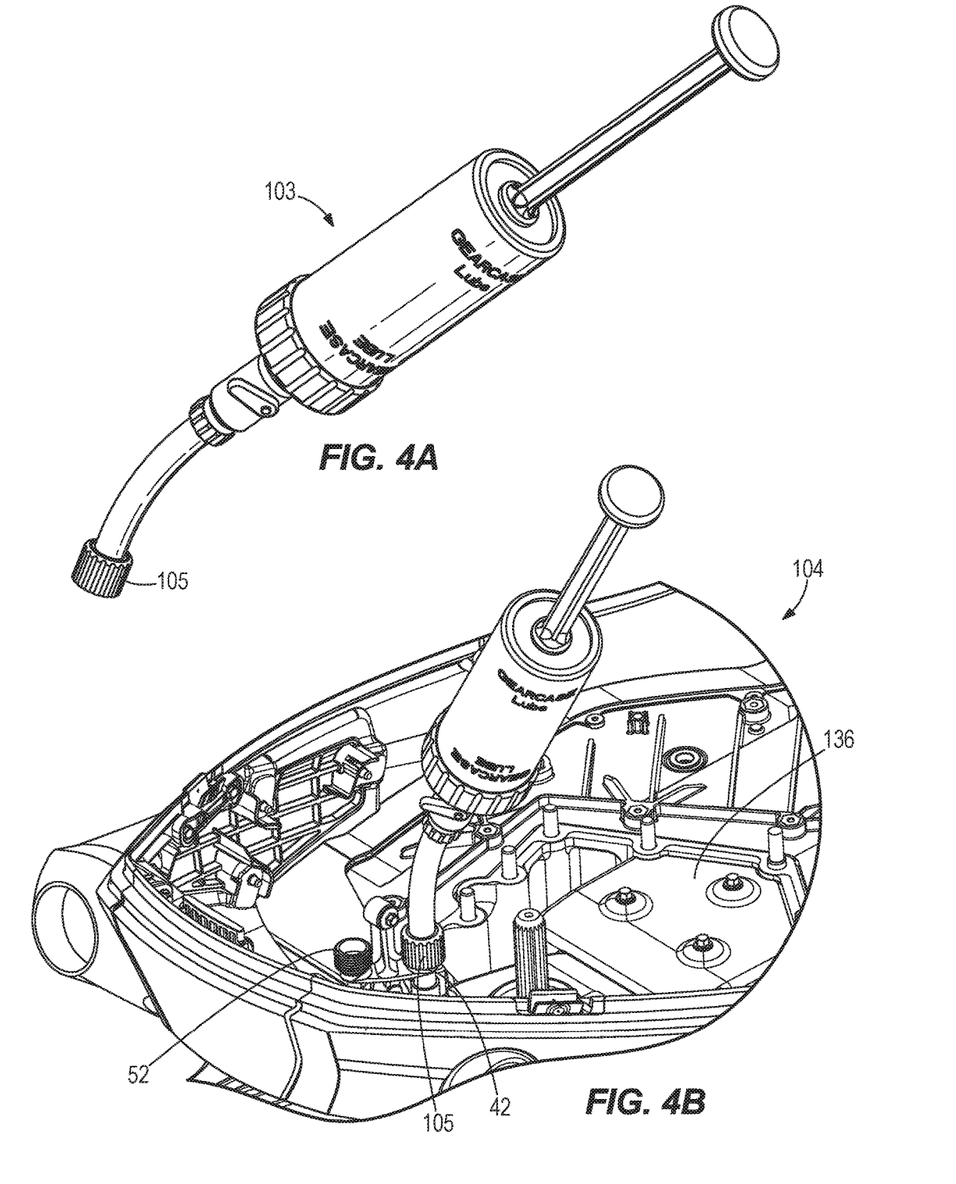
FIGS. 4A-4B illustrate lubrication being added to one embodiment of the lubrication system as part of servicing a lubrication system.

FIG. 3C shows the lubrication flow path during a lubrication fill action. Lubrication is added to the lubrication system 30 through the lubrication service port 42 and is directed through the upper service line 40a into the lubrication circuit 32. In the depicted embodiment, the fresh lubrication enters the system through the evacuation valve 70, which remains open, and flows through the check valve 60b, which is also open. The vent valve 69 also remains in the open position to allow air to be evacuated as the new lubrication enters and fills the lubrication circuit 33. FIG. 4 illustrates a lubrication fill device 103 (in this example, a bottle) having a pre-measured amount of lubrication for adding to the lower gearcase 13. A correct amount of lubrication can be easily added to the lubrication circuit 30 by opening the lubrication service port 42 and the vent opening 52, such as by removing the removable cap 134a, 134b. In embodiments requiring user input to open the hydraulic valve 60, vent valve 69, and/or evacuation valve 70, such input will also be required. Assuming that a sufficient amount of used lubricant has already been evacuated from the lubrication system 30, lubrication can then be added by connecting the dispensing end 105 of the lubrication fill device 103 to the lubrication service port 42. The dispensing end 105 may attach to the lubrication service port 42 by any means, such as by the screw cap arrangement depicted in the FIGURE. The lubrication fill device 103 may be, for example, a pneumatic injection device such as that depicted in FIGS. 4a and 4b, which can force the lubricant into the lubrication circuit 32 with pressure, such as to open the check valve 60b in an applicable embodiment.

Figure 5:
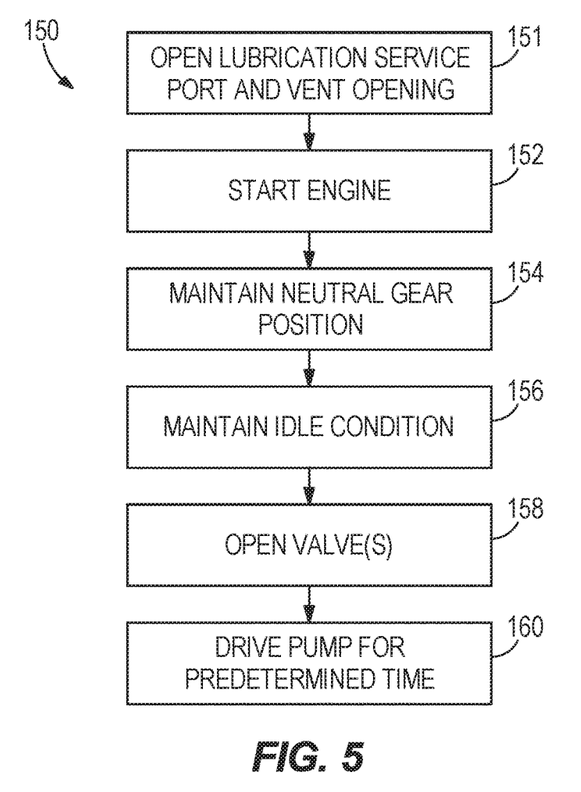
FIG. 5 is a flowchart depicting one embodiment of a method of servicing lubrication in a marine drive.

The system disclosed herein provides for convenient servicing of the lubrication in the lubrication circuit 32 wherein the lubrication can be removed and replaced by a user while the marine vessel 100 remains in the water body 120. In fact, this servicing can be done by a user from on board the marine vessel 100, and thus can be performed anywhere and at anytime. FIG. 5 depicts one embodiment of a method 150 of servicing lubrication in a marine drive 1. A lubrication service port and a vent opening are opened at step 151, and the engine is started at step 152. The engine is maintained in a neutral gear position at step 154, insuring that the transmission remains in neutral so that the transmission and gear arrangements require minimal lubrication during the lubrication evacuation process. For that same reason, the engine is maintained in an idle condition at step 156. For example, an engine control module 4 associated with the marine drive 1 may execute a control module to perform these steps. Likewise, the engine control module 4 may instruct opening of the requisite valves at step 158, such as the hydraulic valve 60a, the vent valve 69, and/or the evacuation valve 70, as is described above with respect to the various embodiments. Alternatively, those valves may be opened, or actuated, manually, as it is also described above with respect to the various embodiments. For example, a hydraulic valve may be adjusted, such as by automatically by instructing the actuator to move the valve from a normal operating position where the lubrication flows through the lubrication circuit to the componentry, to a servicing position wherein the lubrication can be directed to a lubrication service port. Finally, at step 160, the pump is driven to evacuate the lubrication out of the lubrication service port. For example, the pump may be driven for a predetermined amount of time, such as by a timer run by the engine control module 4 that shuts down the engine after a short period of runtime, such as 30 to 60 seconds. This allows removal of the lubrication while ensuring boat operator safety and locking the transmission and other gear arrangements into a mode that requires minimal lubrication during drainage.

Figure 6:
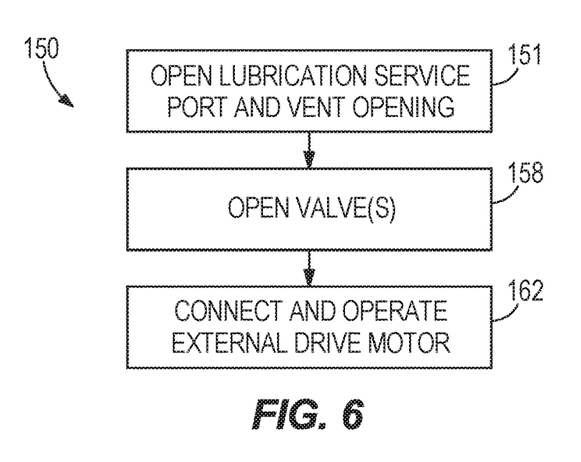
FIG. 6 is a flowchart depicting one embodiment of a method of servicing lubrication in a marine drive.

FIG. 6 depicts another embodiment of a method 150 of servicing lubrication in a marine drive. At step 151, the lubrication service port and vent opening are opened, and at step 158 the valves are opened, such as in response to a user operating a manual connection allowing the user to manually move the hydraulic valve between the normal operating position and the servicing position. An external drive motor is operably connected to the pump at step 162, such as by connecting an electric screwdriver to a flexible drive cable that is connected to the pump via an overrunning bearing. The external drive motor is then operated to drive the pump in order to remove the lubricant from the lubrication circuit. Accordingly, the lubrication can be removed from the lubrication system without running the engine of the marine drive at all.

In the above description, certain terms have been used for brevity, clarity, and understanding. No unnecessary limitations are to be inferred therefrom beyond the requirement of the prior art because such terms are used for descriptive purposes and are intended to be broadly construed. The different apparatuses and method steps described herein may be used alone or in combination with other apparatuses and methods. It is to be expected that various equivalents, alternatives and modifications are possible within the scope of the appended claims.

What is claimed is:

1. A lubrication system in a marine drive on a marine vessel, the system comprising:
   a lubrication circuit that conveys lubrication to componentry of the marine drive;
   a lubrication service port connected to the lubrication circuit;
   a pump disposed in the marine drive, wherein the pump pumps lubrication through the lubrication circuit; and
   a hydraulic valve connected to the lubrication circuit, wherein the hydraulic valve has a normal operating position wherein lubrication in the lubrication circuit is pumped by the pump to the componentry, and has a servicing position wherein lubrication in the lubrication circuit is pumped by the pump to the lubrication service port.

2. The lubrication system of claim 1, wherein the lubrication service port is above a water line of a water body surrounding the marine drive and is positioned such that lubrication in the lubrication circuit can be removed and replaced by a user when the marine vessel is in the water body.

3. The lubrication system of claim 2, wherein the lubrication circuit is in a lower gearcase of the marine drive and the componentry includes at least one of bevel gears, a clutch, and a propulsor shaft.

4. The lubrication system of claim 1, a valve actuator connected to the hydraulic valve, wherein the valve actuator is configured to move the hydraulic valve into and out of the normal operating position and the servicing position.

5. The lubrication system of claim 4, wherein the valve actuator is a manual connection allowing a user to manually move the hydraulic valve between the normal operating position and the servicing position.

6. The lubrication system of claim 4, wherein the valve actuator is operated by a solenoid, the energization of which is controlled by at least one of an engine control module in the marine drive and a user interface operable by a user.

7. The lubrication system of claim 4, further comprising a vent opening, wherein the hydraulic valve connects the vent opening to the lubrication circuit when it is in the servicing position.

8. The lubrication system of claim 1, further comprising a vent valve positionable in an open position to connect a vent opening to the lubrication circuit, and in a closed position to disconnect the vent opening from the lubrication circuit.

9. The lubrication system of claim 8, wherein the hydraulic valve is a check valve that is biased into a closed position that blocks the flow of lubrication into the lubrication circuit and that opens under a normal operating pressure within the lubrication circuit.

10. The lubrication system of claim 9, further comprising an evacuation valve between the oil pump and the lubrication service port that opens to allow lubrication to be pumped out of the lubrication service port.

11. The lubrication system of claim 1, wherein the pump is connectable to an external drive motor to drive the pump to pump lubrication from the lubrication circuit to the lubrication service port.

12. The lubrication system of claim 11, wherein the external drive motor connects to the pump via a flexible drive cable, wherein the flexible drive cable has a first end connected to a fitting and a second end operably connected to the pump via a 1-way bearing.

13. The lubrication system of claim 12, wherein the external drive motor is an electric screw driver.

14. The lubrication system of claim 1, wherein the pump is driven by a drive shaft of the marine drive to pump lubrication from the lubrication circuit to the lubrication service port.

15. A marine drive on a marine vessel comprising:
   a lubrication circuit that conveys lubrication to componentry of the marine drive;
   a lubrication service port connected to the lubrication circuit, the lubrication service port positioned to be accessible by a user when the marine drive is in a water body;
   a pump disposed in the marine drive that pumps the lubrication through the lubrication circuit; and
   a hydraulic valve connected to the lubrication circuit, wherein the hydraulic valve is positionable into a normal operating position wherein the lubrication in the lubrication circuit is pumped to the componentry, and into a servicing position wherein lubrication in the lubrication circuit is pumped to the lubrication service port.

16. The marine drive of claim 15, further comprising a flexible drive cable having a first end connected to a fitting attachable to an external drive motor and a second end operably connected to the pump via a 1-way bearing.

17. The marine drive of claim 15, wherein the marine drive is an outboard motor, and the lubrication service port is located within a housing of the marine drive and above a mounting bracket connecting the outboard motor to the marine vessel.

18. A method of servicing lubrication in a marine drive on a marine vessel, the marine drive having a lubrication circuit that conveys lubrication to componentry of the marine drive and a pump that pumps the lubrication through the lubrication circuit, the method comprising:
   adjusting a hydraulic valve in the lubrication circuit from a normal operating position wherein lubrication in the lubrication circuit is directed to the componentry, to a servicing position wherein lubrication in the lubrication circuit is directed to a lubrication service port;
   driving the pump to pump lubrication in the lubrication circuit out of the lubrication service port.

19. The method of claim 18, further comprising placing the marine drive in a neutral gear, operably connecting a drive shaft of the marine drive to the pump, and operating the engine for a predetermined amount of time to drive the pump.

20. The method of claim 18, further comprising connecting an electric screw driver to a flexible drive cable operably connected to the pump, and operating the electric screw driver to drive the pump.

\* \* \* \* \*